Jan. 18, 1966 G. W. FISCHER 3,230,097
COATING COMPOSITION
Filed May 31, 1962
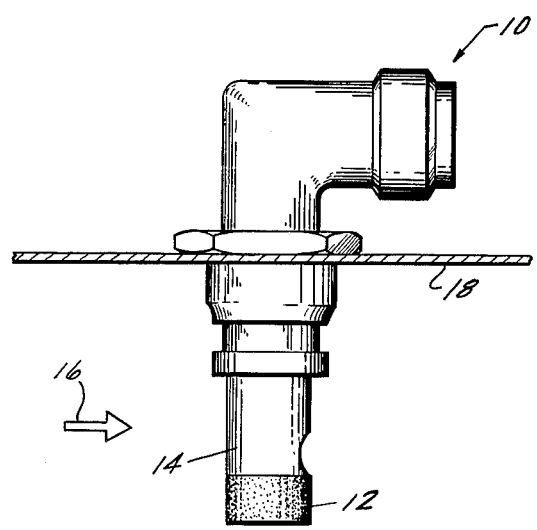
INVENTOR.
GEORGE W. FISCHER
BY
ATTORNEY United States Patent Office 3,230,097
Patented Jan. 18, 1966

3,230,097
COATING COMPOSITION
George Wesley Fischer, Cincinnati, Ohio, assignor to General Electric Company, a corporation of New York
Filed May 31, 1962, Ser. No. 199,192
5 Claims. (Cl. 106—1)

This invention relates to metallic coating compositions and, more particularly to a hard, high melting coating material of improved oxidation and erosion resistance.

In the operation of flight propulsion apparatus such as a jet engine, numerous parts are subjected to high temperatures under strenuous oxidizing and erosive conditions caused by the flow of air and airborne particles. Examples of such parts are various guide vanes, turbine blading and combustion igniters, portions of which are made of a relatively thin material. Thus a relatively small amount of erosion or oxidation can, in a short period of time, destroy the usefulness of such parts, requiring their repair of replacement.

Attempts have been made to apply metallic coatings, such as by spraying molten particles onto the surface of such parts or by applying a ceramic type coating to the critical surface of such parts. However the increased temperatures and more strenuous abrasive conditions existing in improved propulsion equipment have eliminated many of the solely metallic type coatings. Furthermore, because of the relatively high thermal gradient accompanying cycling of such apparatus and the accompanying thermal shock to such hot operating parts, particularly of a thin cross section, ceramic coatings tend to lose their bond with the coated base.

It is a principal object of the present invention to provide a material capable of being applied as a coating of high hardness and melting point and which has good oxidation and erosion resistance along with good bonding characteristics.

Another object is to provide an improved composite article which is of increased operating life because of a composite coating portion bonded with the article.

These and other objects and advantages will be more readily recognized from the following detailed description, examples and the drawing which shows an igniter with a composite tip portion mounted in a combustion chamber.

Briefly stated, the objects of the present invention can be achieved through the use of a blend of the powdered materials in proportions by weight, of 25–35% chromium carbide, 25–35% chromium and 5–25% of a nickel base brazing alloy having a melting point in the range of 1800–2200° F., the balance of the mixture being nickel.

Processes for spraying molten particles to coat another material are sometimes referred to as "metallizing." In an older form of metallizing, a metal wire or powder is fed through a flame, frequently of the oxy-acetylene type, in which the wire or powder is melted and atomized into a fine spray by a blast of compressed gas or air. Because this type of metallizing equipment operates up to about 6000° F., it was not possible to melt and spray many refractory materials, such as tungsten carbide and chromium carbide.

Recently, however, a newer type of equipment, sometimes referred to as plasma arc spraying or metallizing equipment, has become available. A large amount of heat, such as about 10,000–30,000° F., is generated in this equipment by passing a gas through an arc struck between two electrodes. Thus a large variety of metal or ceramic materials which do not decompose or volatilize at plasma temperatures can be introduced into the plasma arc in powder form. These are melted and carried to a workpiece by the plasma as a spray. The introduction of plasma arc spraying equipment has provided a means for applying to virtually any base material coatings of such materials as tungsten, tungsten carbide, chromium and chromium carbide which are difficult, if not impossible, to apply from a molten spray with conventional equipment. It has been found that the material of this invention when applied as a coating by means of plasma arc spraying provides a hard, adherent, high melting point coating of good oxidation and erosion resistance.

Numerous applications exist for such a coating having good adherence, good oxidation resistance and good erosion resistance. For example, the operating life of the igniter 10 of FIG. 1 has been substantially increased by bonding the material of this invention with the body material of tip portion 12 of outer shield 14. The outer shield protects inner and outer conductors, located within the igniter, from erosion by the fluid and fluid-borne particles directed, as shown by arrow 16, within combustion chamber walls, a fragment, 18, of which is shown in the drawing. For example, in a jet engine, the fluid is an air and fuel mix and the particles may be a variety of normal air-borne particles as well as products of combustion and erosion from other components of the engine.

Another application for such a coating having high hardness and abrasion resistance characteristics along with a tightly adherent bond is as a filler portion between stationary and rotating parts to develop proper clearance during operation. For example, the material of this invention has been applied as a coating on the inside surfaces of a jet engine compressor casing to wear the tips of mating rotating compressor blades during operation.

Although plasma arc spray equipment will allow the application of a variety of materials in powder form, it has been found that a particularly significant range of the components, shown in the following Table II, have unusual characteristics.

One of the features of the present invention is the provision, in a material suitable for application as coating, of a component which will control a liquid phase at the sintering temperature of the coating. It has been found that by including between about 5–25 weight percent of a nickel base filler alloy having a melting point within the range of about 1800–2200° F., the material of the present invention can be controlled for a variety of applications.

The following Table I gives the composition and melting points of typical nickel base filler alloys which can be used in the material of the present invention.

TABLE I

Ni base filler alloys

| Example | Weight percent (balance Ni) | | | | Approx. Melting Point (° F.) |
|---|---|---|---|---|---|
| | Si | B | Cr | Fe | |
| G14 | 2 | .7 | | | 2,125 |
| M50 | 3.5 | 2.3 | | | 1,925 |
| M51 | 4.5 | 2.7 | | | 2,050 |
| M52 | 5 | 3.3 | | | 1,825 |
| G81 | 10 | | 19 | | 2,200 |
| A77 | 4 | 3 | 7 | 3 | 1,900 |

The following Table II lists some of the powder mixtures which were prepared using filler alloy M50 of Table I in order to study the characteristics of the coating produced from the material of the present invention which in Table II are defined particularly by Examples K, L, M and N.

TABLE II
*Powder ingredients (wt. percent)*

| Example | Cr | $Cr_3C_2$ | M50 Filler Alloy | Ni |
|---|---|---|---|---|
| A |  | 88 |  | 12 |
| D | 25 |  |  | 75 |
| G | 45 |  | 5 | 50 |
| H |  | 75 |  | 25 |
| I |  | 70 | 5 | 25 |
| J | 35 | 40 |  | 25 |
| K | 35 | 35 | 5 | 25 |
| L | 25 | 25 | 25 | 25 |
| M | 30 | 30 | 18 | 22 |
| N | 32 | 32 | 14 | 22 |

The examples of Table II were evaluated as coatings over panels of an 18% chromium, 8% nickel, balance essentially iron stainless steel. Each panel was prepared by degreasing and then grit blasting with an angular steel grit after which the panel was wiped with acetone. Each example of the material, in a powder blend, was then applied through a plasma arc spray unit held at a distance from the workpiece of about 2½–3″. The powder flow rate was 2–3 pounds per hour with the nitrogen, hydrogen and powder propellant gas flow rates being, respectively, 90–100, 8–10 and 8–10 cubic feet per hour. Both fused and unfused panels were tested with the fused panels being heated for fusing in a hydrogen atmosphere furnace for 10 minutes at 2100° F.

The preferred size of major fraction of the powders used in the coating preparation was in the range of −200 to +325 mesh. However it has been found that powders as large as −100 mesh size and powders including substantial portions of smaller than 325 mesh can be used for critical coatings. Another type of powder blend which can be used is a mixture of coated $Cr_3C_2$ powders or coated Cr powders or both, the coating being the low melting phase of nickel or filler alloy or both.

Although it was recognized that the coatings produced from the powder blends of Table II had good oxidation resistance, testing of the coating was primarily directed toward erosion resistance and bonding strength as represented by erosion tests, scribe tests and bend tests. Erosion testing was conducted using standard commercial grit blasting equipment held at an angle of about 45° to the specimen panel. At a distance of 3″ between the nozzle tip and the specimen, aluminum oxide grit (number 80) was directed toward the specimen for one minute at an air pressure of 40 p.s.i. The scribe tester employed a diamond at an applied load of 800 grams for periods of one minute to determine wear in the coating.

The most significant test was a simple bend test involving the bending of a panel approximately 90° around a half inch radius.

Only those blends represented by Examples K, L, M and N showed a combination of erosion resistance and tight bond along with good oxidation resistance.

With the introduction of high temperature operating plasma arc spraying equipment, it would seem that the application of a hard cermet coating of the type shown by Example A, including about 88 weight percent $Cr_3C_2$ with about 12 weight percent nickel as a binder, would provide a suitable barrier to corrosion and erosion. However, the above described testing has shown that such coatings spalled and flaked off. Although coatings from the mixtures of Examples D and G afford fairly good oxidation resistance, they had insufficient hardness to resist erosion and hence were removed during the grit blast erosion testing. Doubling the nickel content of mixture of Example A as shown by Example H did not improve the characteristics of Example A nor did the substitution of about 5 weight percent of filler alloy assist Example H in overcoming flaking during testing. Testing of Example J has shown that as high as 40 weight percent $Cr_3C_2$ is too great an amount of $Cr_3C_2$ in the presence of up to about 35% chromium because the bond of the coating applied using the mixture of Example J was broken in grit blasting. However, the Examples K, L, M and N were hard and tightly adherent to the base material and had good oxidation and erosion resistance.

The composition of Example K was applied, as described above, to a thickness of about .004–.006″ on the tip portion of the igniter shown in the drawing. Example K was used because it was found that with the inclusion of the lower amounts of filler alloy no fusion is required during the application processing. Because the igniter was designed to operate at about 2100° F. fusion occurred in service. The small addition of filled alloy furnishes a sufficient amount of transient liquid phase to afford good bonding and to keep the coating from flaking off when operating at such high temperatures. However, with the higher percentages of filler alloy, best results are obtained by fusion prior to operation. Uncoated igniters had failed in as little as 15 minutes whereas the igniter coated with the material of Example K was virtually unaffected after about 6 hours operation at about 2100° F. The material of the igniter nominally consisted essentially of, by weight, 0.1% C, 5% Fe, 28% Mo, 0.4% V with the balance nickel.

The composition of Example N was successfully applied, as described above, and successfully tested on a jet engine nozzle diaphragm partition of a cobalt base alloy nominally consisting essentially of, by weight, 0.5% C, 25% Cr, 10% Ni, 1% Fe, 7.4% W with the balance Co. Thus unusual results have been achieved by applying the material of the present invention as a coating with unusual results to a variety of materials as represented by the iron base, nickel base and cobalt base alloys described above.

As shown in Table I, a variety of filler alloys can be selected depending on the base metal to which the coating is to be applied and whether or not liquid phase sintering is desired during service or operation.

The material of the present invention can be looked upon as a two part system, the first part being a high melting component comprising about 50–70 weight percent of a mixture of chromium powder and chromium carbide and a lower melting component made up of nickel powder and a nickel base filler alloy. The variation of the composition of the lower melting component adjusts the response to liquid phase sintering. For example, if it is desirable in the manufacture of a particular article to conduct liquid phase sintering of the coating either more slowly or at a higher temperature to assure an even better bonded coating, the lower range of the filler alloy can be included in the composition so that when the filler alloy melts, it will alloy with the nickel and increase the melting point of the combination almost immediately. Therefore with a change in the balance between the nickel powder and the nickel base filler alloy, a change occurs in the balance of the liquid phase.

The composite coating produced from the material of the present invention, has been shown by photomicrographs to have a finer particle size and better dispersed porosity along with a better bond than the other types of coatings tested. Within the composition range of the present invention, the chromium imparts good oxidation resistance and hence becomes one of the key elements. The chromium carbides are stable at elevated temperatures and impart good wear and erosion resistance. The nickel furnishes a lower melting matrix and improves coating resistance to non-oxidizing gases. The nickel base filler alloy furnishes a lower melting liquid phase and, therefore, permits the coating to be fused when such treatment is desirable.

Although the present invention has been described in connection with particular examples, it will readily be recognized by metallurgists and those skilled in the art of coating application, the variations and modifications of which the present invention is capable.

What is claimed is:
1. For use in depositing a coating by a molten spray process, a powdered mixture consisting essentially of, by weight:
   25–35% chromium carbide;
   25–35% chromium;
   5–25% of a nickel base filler alloy having a melting point in the range of about 1800–2200° F. and consisting essentially of silicon, at least one element selected from the group consisting of boron, chromium and iron, with the balance of the filler alloy being nickel; and
   the balance of the mixture being nickel.
2. For use in depositing a coating by a molten spray process, a powdered mixture consisting essentially of, by weight:
   25–35% chromium carbide;
   25–35% chromium;
   5–25% of a nickel base filler alloy consisting essentially of, by weight, 2–5% Si, 0.7–3.3% B, balance of the filler alloy Ni; and
   the balance of the mixture being nickel.
3. For use in depositing a coating by a molten spray process, a powdered mixture consisting essentially of, by weight:
   30–32% chromium carbide;
   30–32% chromium;
   14–18% of a nickel base filler alloy consisting essentially of, by weight, 3.5–5% Si, 2.3–3.3% B, balance Ni; and
   the balance of the mixture being nickel.
4. A composite article including an improved portion having a surface of increased hardness, erosion resistance and oxidation resistance, the improved portion comprising:
   a body portion; and
   a coating portion bonded with the body portion, and consisting essentially of, by weight:
   25–35% chromium carbide;
   25–35% chromium;
   5–25% of a nickel base filler alloy having a melting point in the range of about 1800–2200° F. and consisting essentially of silicon, at least one element selected from the group consisting of boron, chromium and iron, with the balance of the filler alloy being nickel; and
   the balance of the coating portion being nickel.
5. An igniter including an improved tip portion having a surface of increased hardness, erosion resistance and oxidation resistance, the improved tip portion comprising:
   a body portion of an alloy selected from the group consisting of iron, nickel and cobalt alloys; and
   a coating portion bonded with the body portion and consisting essentially of, by weight:
   25–35% chromium carbide;
   25–35% chromium;
   5–25% of a nickel base filler alloy consisting essentially of, by weight, 2–5% Si, 0.7–3.3% B, balance Ni; and
   the balance of the coating portion being nickel.

References Cited by the Examiner

UNITED STATES PATENTS

| | | | |
|---|---|---|---|
| 1,465,547 | 8/1923 | Driver | 117—130 |
| 1,493,191 | 5/1924 | Golyer | 75—120 |
| 2,763,921 | 9/1956 | Turner et al. | 117—22 |
| 2,862,844 | 12/1958 | Luedeman | 148—24 |
| 2,942,970 | 6/1960 | Goetzel et al. | 117—131 |
| 2,964,420 | 12/1960 | Poorman et al. | 117—22 |
| 2,972,550 | 2/1961 | Pelton | 117—22 |
| 3,075,066 | 1/1963 | Yenni et al. | |
| 3,150,938 | 9/1964 | Pelton et al. | 117—22 |

OTHER REFERENCES

Lange's: "Handbook of Chemistry and Physics," 9th edition, 1956, page 860, Handbook Publisher's Inc., Sandusky, Ohio.

ALEXANDER H. BRODMERKEL, *Primary Examiner.*